United States Patent
Hsu et al.

(10) Patent No.: US 7,672,690 B2
(45) Date of Patent: Mar. 2, 2010

(54) APPARATUS, AND ASSOCIATED METHOD, FOR FACILITATING SYSTEM SELECTION IN A MULTI-NETWORK RADIO COMMUNICATION SYSTEM

(75) Inventors: Liangchi Hsu, San Diego, CA (US); Chingcheng Shih, San Diego, CA (US); Chenghua Cheng, legal representative, San Diego, CA (US); Walid Hosseini, San Diego, CA (US); Giridhar Mandyam, Plano, TX (US)

(73) Assignee: Nokia Corporation, Espoo (FI)

( * ) Notice: Subject to any disclaimer, the term of this patent is extended or adjusted under 35 U.S.C. 154(b) by 1080 days.

(21) Appl. No.: 10/829,922

(22) Filed: Apr. 22, 2004

(65) Prior Publication Data

US 2005/0238041 A1   Oct. 27, 2005

(51) Int. Cl.
*H04M 1/00* (2006.01)

(52) U.S. Cl. .................. 455/552.1; 455/436; 455/432.1; 455/443; 455/456.1; 455/435.3; 370/252; 370/328

(58) Field of Classification Search .............. 455/432.1, 455/435.3, 456.1, 424, 435.2, 436, 443, 552.1; 370/328, 252

See application file for complete search history.

(56) References Cited

U.S. PATENT DOCUMENTS

| 6,934,544 | B2 * | 8/2005 | Cooper et al. ............ 455/435.2 |
| 2003/0134636 | A1 * | 7/2003 | Sundar et al. ............... 455/432 |
| 2004/0002330 | A1 * | 1/2004 | Chitrapu .................. 455/426.2 |
| 2004/0023669 | A1 * | 2/2004 | Reddy ..................... 455/456.1 |
| 2004/0114553 | A1 * | 6/2004 | Jiang et al. .................. 370/328 |
| 2005/0147060 | A1 * | 7/2005 | Buckley ..................... 370/328 |

FOREIGN PATENT DOCUMENTS

| GB | 2 391 434 | 2/2004 |
| WO | WO 2004/091246 | 10/2004 |
| WO | WO 2005/050965 | 6/2005 |

* cited by examiner

*Primary Examiner*—Charles N Appiah
*Assistant Examiner*—Kwasi Karikari
(74) *Attorney, Agent, or Firm*—Alston & Bird LLP

(57) ABSTRACT

Apparatus, and an associated method, by which to facilitate selection of with which network portion of a WLAN-cdma2000, or other multi-network radio communication system, that the mobile node should communicate. A parameter message is communicated to the mobile node. The parameter message includes indications, values of which are extracted from the message, buffered at a buffer, and subsequently accessed. A selector utilizes the accessed values to determine with which of the network portions that the mobile node shall communicate.

18 Claims, 6 Drawing Sheets

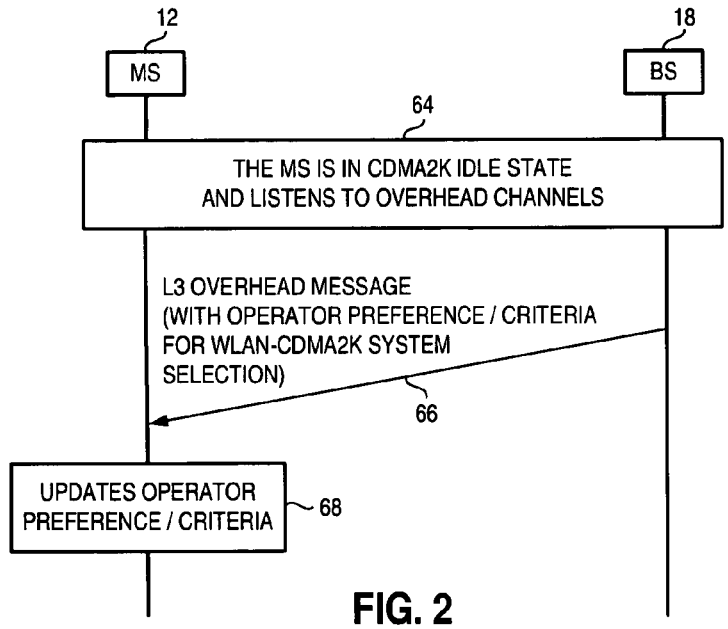

FIG. 2

| | 152 | |
|---|---|---|
| 154 | 156 | 158 |
| CAUSES FOR SYSTEM SELECTION / DETERMINATION | UPDATED OPERATOR PREFERENCE / CRITERIA | DEFAULT OPERATOR PREFERENCE / CRITERIA |
| 162 ACQUISITION FAILURE | WLAN | C2K |
| 164 NEW SYSTEM | C2K | C2K |
| 166 SYSTEM RESELECTION | C2K | C2K |
| 168 RESCAN | C2K | C2K |
| 172 PROTOCOL MISMATCH | C2K | C2K |
| 174 SYSTEM LOST | WLAN | C2K |
| 176 ACCESS DENIED | WLAN | C2K |
| 178 ERROR INDICATION | C2K | C2K |
| 182 REGISTRATION REJECTED | C2K | C2K |
| 184 WRONG NETWORK | WLAN | C2K |
| 186 (OTHER) | TBD | TBD |

FIG. 7

APPARATUS, AND ASSOCIATED METHOD, FOR FACILITATING SYSTEM SELECTION IN A MULTI-NETWORK RADIO COMMUNICATION SYSTEM

The present invention relates generally to WLAN-cellular interworking in a communication system that selectably provides for communication of a mobile node by way of a wireless local area network and with a cellular network. More particularly, the present invention relates to apparatus, and an associated method, by which to facilitate selection, at the mobile node, of through which of the networks that the mobile node shall communicate.

Selection is made by the mobile node at any stage of its operation, i.e., when the mobile node is in the active, inactive, traffic, or idle modes. And, selection is made, responsive, in part, to L3 signaling layer information provided to, or by, the mobile node. The selection is thereby able to be made, at least in part, upon dynamically adjustable selection criteria.

BACKGROUND OF THE INVENTION

A communication system operates to provide for the communication of data. Data is communicated during operation of the communication system between communication stations that are interconnected by way of a communication channel. At least one communication station forms a sending station that sends data upon the communication channel, and at least another of the communication stations forms a receiving station that receives the data communicated upon the communication channel.

Many different types of communication systems have been developed, deployed, and used by way of which to communicate data between communication stations. Different types of communication systems exhibit different communication capabilities, permitting different types of communication services to be effectuated by way of the different types of communication systems. As advancements in technologies permit, improvements to existing communication systems are made and new communication systems are developed and deployed. As technological advancements shall likely continue in the future, new and improved communication systems, incorporating new technologies, shall likely continue to be developed and deployed.

A radio communication system is an exemplary type of communication system. A radio communication system utilizes radio channels to form communication channels that interconnect the sending and receiving stations between which data is communicated. Radio channels are defined upon radio links, portions of the electromagnetic spectrum. When radio channels are utilized by way of which to communicate data, communications are effectuable between communication stations positioned at locations between which wireline connections cannot be formed.

Because a wireline is not required to interconnect the communication stations, communications are effectuable between communication stations positioned at locations at which interconnection by way of a wireline connection would be unfeasible. Communications by way of a radio communication system are thereby sometimes effectuable when communications by way of a wireline communication system would not be possible. Additionally, a radio communication system is amenable for implementation as a mobile communication system in which one or more of the communication stations between which data is communicated is permitted mobility. Communication stations of a wireline communication system, in contrast, are of limited mobility capabilities due to the need to utilize the wireline connection.

A cellular communication system is a type of radio communication system. Telephonic communication of both voice and data is provided by way of a cellular communication system. Network infrastructures of cellular communication systems have been deployed to encompass significant portions of the populated areas of the world. A user typically communicates by way of a cellular communication system through the use of a mobile node. A mobile node is, e.g., a portable radio transceiver, typically of dimensions permitting its carriage by the user. The network infrastructure of the cellular communication system includes a plurality of spaced-apart fixed-site transceivers, referred to as base transceiver stations. The base transceiver stations each define coverage areas. And, a mobile node typically communicates with a base transceiver station in whose coverage area that the mobile node is positioned. If a mobile node is moved, subsequently to be positioned within the coverage area of another base transceiver station, a communication hand-off is performed to permit continued communications with the mobile node.

While first-installed cellular communication systems generally utilize analog communication technologies, successor-generation cellular communication systems make use of digital communication techniques and, increasingly, provide for packet-based communications.

A wireless local area network (WLAN) is also a type of radio communication system. While a wireless local area network is a radio-extension of a local area network, a wireless local area network exhibits some characteristics that are analogous to those of cellular communication systems. That is to say, a wireless local area network also typically includes a network part having a plurality of fixed-site transceivers, each of which defines a coverage area. And, mobile nodes, operable in a wireless local area network, typically communicate with a fixed-site transceiver, sometimes referred to as an access point, of the wireless local area network when the mobile node is positioned within the coverage area of the access point.

Mobile nodes have been constructed to permit their operation to communicate in both a wireless local area network and to communicate in a cellular communication system, such as a cellular communication system operable pursuant to a cdma2000 operating specification. Interworking arrangements have been proposed to facilitate interworking, e.g., inter-adaptability of the separate wireless local area network and cellular networks to permit a mobile node to communicate by way of either of the networks and to switch therebetween.

For instance, proposals have been set forth by which to facilitate mobile-node selection of through which of the networks that the mobile node shall communicate. However, existing proposals generally do not provide for network selection from all of the operating modes and states in which a mobile node might be operated when the selection must be made.

If an improved manner by which to perform such selection could be provided to a mobile node, improved interworking operation would be permitted.

It is in light of this background information related to interworking arrangements in a multi-network radio communication system that the significant improvements of the present invention have evolved.

SUMMARY OF THE INVENTION

The present invention, accordingly, advantageously provides apparatus, and an associated method, by which to facilitate WLAN-cellular interworking in a radio communication system that selectably provides for communication with a mobile node by way of a WLAN and by way of a cellular network.

Through operation of an embodiment of the present invention, a manner is provided by which to facilitate selection, at the mobile node, of through which of the networks that the mobile node shall communicate.

The mobile node selects, at any stage of its operation, of through which of the network portions, i.e., a WLAN portion or a cellular portion, that the mobile node shall subsequently communicate. Selection is made when the mobile node is in a WLAN active state, a WLAN nonactive state, a cellular active or traffic state, and a cellular idle state. Additionally, criteria used in the selection is dynamically adjustable, thereby to provide flexibility to the manner of operation by which the selection is made.

In one aspect of the present invention, operator preference criteria is utilized when making selection at the mobile node of with which of the network portions that the mobile node shall communicate. The operator preference criteria is provided to the mobile node, e.g., by a control message sent to the mobile node. The operator preference criteria is sent to the mobile node as a signaling layer parameter message populated with values that identify the operator preference criteria. A detector embodied at the mobile node detects the message communicated thereto and extracts the values of the preference criteria contained in the message. The information is buffered at the mobile node, subsequently to be used when selection is to be made through which of the network portions that the mobile node shall communicate.

The values extracted from the signaling layer parameter message and stored at the mobile node are buffered at a buffer. The contents of the buffer are selectably updatable when the values extracted from the signaling layer parameter message indicates change to a value contained therein. Corresponding change is made to the buffered value or values that are detected to have changed in value. The values buffered at the buffer thereby are up-to-date. And, the capability to change the content of the buffer provide the dynamic adjustment capability permitting the adjustment of the selection criteria by which selection is made at the mobile node.

In another aspect of the present invention, the mobile node makes selection of through which network portion that the mobile node shall communicate subsequent to powering-on of the mobile node. Selection is based upon buffered values at the buffer of the operator preference criteria. In one implementation, upon powering-up, manual selection at the mobile node by a user of the mobile node is provided. In the event manual selection is not made, the mobile node defaults to a cellular initialization state, and the contents of the buffer are accessed to select whether the mobile node should be operated in a cellular mode to permit communication of the mobile node by way of the cellular network portion or to operate in a WLAN mode to permit communication of the mobile node by way of the WLAN portion of the network of the radio communication system.

In another aspect of the present invention, selection is made at the mobile node of through which of the network portions that the mobile node shall communicate when the mobile node is in a cellular mode of operation, e.g., in an initialization state, an idle state, or during idle hand-off procedures. When in the idle state, the mobile node monitors control channels for communication of messages thereto. When a signaling layer parameter message is detected, the values of the message are extracted and selectably buffered at a buffer maintained at the mobile node.

In another aspect of the present invention, the operator preference criteria is used to make selection at the mobile node of with which of the network portions that the mobile node shall communicate when the mobile node is in a WLAN active state or in a cellular traffic state and hand-off of communications from an active fixed-site transceiver to a target, fixed-site transceiver is to be carried out. The operator preference criteria buffered at the buffer is again accessed to make selection of with which of the network portions that the mobile node shall communicate. That is to say, a determination is made as to which fixed-site transceiver, a fixed-site transceiver of the cellular network portion or a fixed-site transceiver of the WLAN portion is to be the target fixed-site transceiver to which communications are to be handed off.

The operator preference criteria, in an exemplary implementation, comprises values that are derived from a list of causes set forth in a cdma2000 L3 signaling specification relating to the causes that cause a mobile station to enter into a system determination sub-state. The causes, from which the criteria are derived, include, e.g., an acquisition failure indication, a new system indication, a system reselection indication, a rescan indication, a system lost indication, an access denied indication, an error indication, a registration rejected order, and a wrong network indication. Other causes, and values derived therefrom, can also be selected and utilized.

Thereby, through use of operator preference criteria, a mobile node is able better to select with which network portion that the mobile node should communicate. Selection is made when the mobile node is operated in any of its possible operating states, either those defined pursuant to a WLAN operating mode and those defined pursuant to a cellular operating mode.

In these and other aspects, therefore, apparatus, and an associated method, is provided for a radio communication system. The radio communication system has a network part including a first network portion operable pursuant to a first communication scheme and a second network portion operable pursuant to a second communication scheme. A mobile node is selectably operable to communicate by way of either of the first network portion and the second network portion. And, the radio communication system is defined in terms of logical layers, including a signaling layer. Selection, by the mobile node, to which of the first and second network portions, respectively, that the mobile node shall communicate is facilitated. A signaling layer parameter message detector is embodied at the mobile node. The signaling layer message detector is selectably for detecting values populating the signaling layer parameter message. A signaling layer parameter message buffer is adapted to receive indications of the values detected by the signaling layer parameter message detector. The signaling layer parameter message buffer buffers the values of the signaling layer parameter message. A selector is embodied at the mobile node. The selector selectably selects through which of the first and second network portions to communicate based upon the values buffered at the signaling layer parameter buffer.

A more complete appreciation of the present invention and the scope thereof can be obtained from the accompanying drawings that are briefly summarized below, the following detailed description of the presently-preferred embodiments of the present invention, and the appended claims.

BRIEF DESCRIPTION OF THE DRAWINGS

FIG. 2 illustrates a message sequence diagram representative of operation of the radio communication system shown in FIG. 1 according to an aspect of an embodiment of the present invention.

FIG. 7 illustrates an exemplary table formed pursuant to an exemplary embodiment of the present invention.

DETAILED DESCRIPTION

Figure 1:
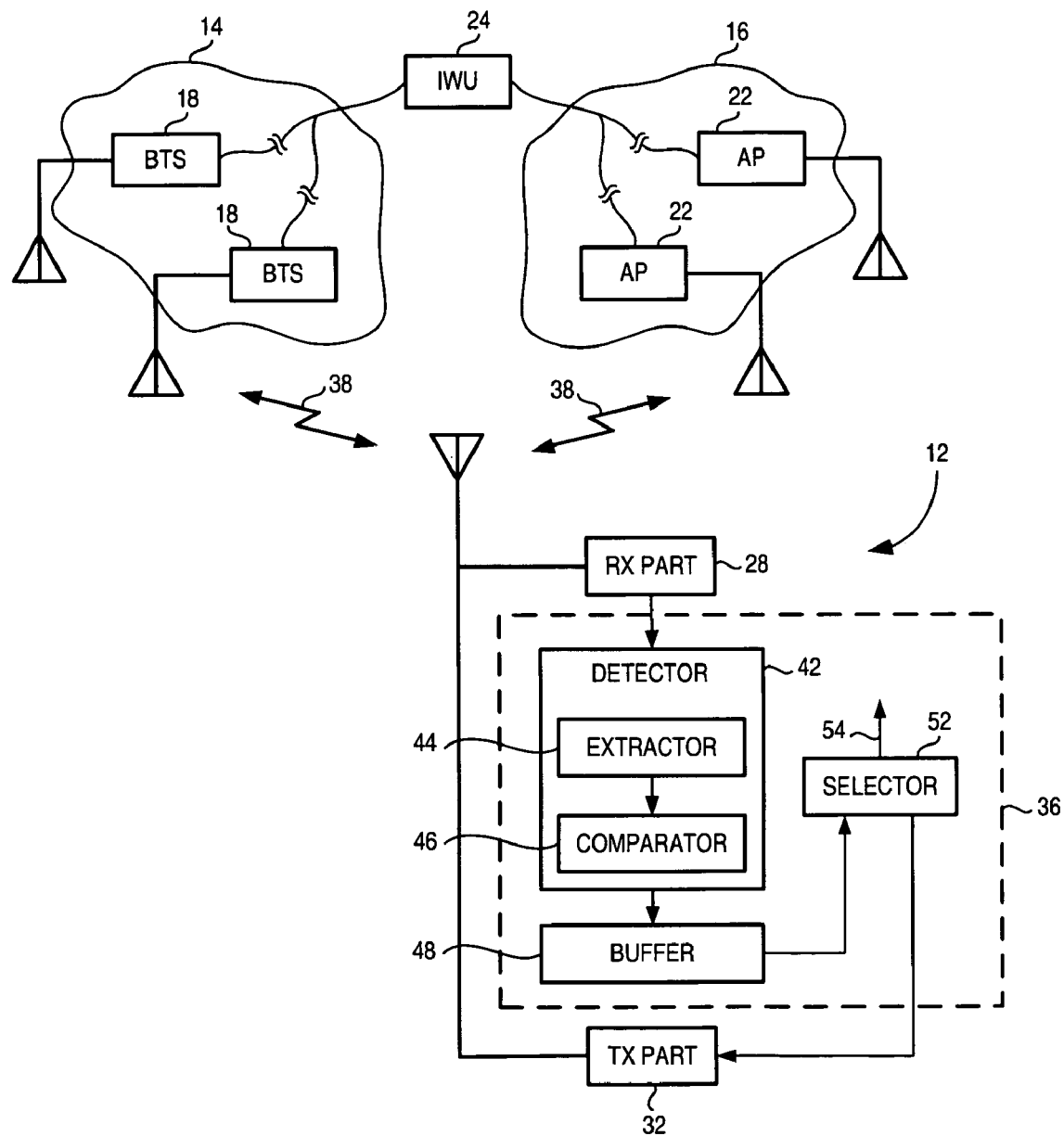
FIG. 1 illustrates a functional block diagram of a radio communication system in which an embodiment of the present invention is operable.

Referring first to FIG. 1, a radio communication system, shown generally at 10, provides for radio communications with mobile nodes, of which the mobile node 12 is representative. The radio communication system includes a network part that is formed of at least two portions, here a first portion 14 and a second portion 16. The first portion 14 forms a cellular network, and the second portion 16 forms a wireless local area network (WLAN). In the exemplary implementation, the cellular network formed of the portion 14 is operable generally pursuant to a cdma2000 operating specification. And, in the exemplary implementation, the wireless local area network forming the second portion 16 is operable pursuant to an IEEE802.11 operating specification. The network portions 14 and 16 each include a plurality of fixed-site transceivers. Two representative base transceiver stations (BTSs) 18 of the cellular network are shown in the figure. And, two representative access points (APs) 22 are shown. Each of the fixed-site transceivers defines a coverage area, as mentioned previously, when a mobile node is positioned within a coverage area of a fixed-site transceiver, the mobile node is generally capable of communicating with the fixed-site transceiver in whose coverage area that the mobile node is positioned. Coverage areas, particularly of the fixed-site transceivers of the different network portions sometimes overlap, and a mobile node might be positioned at a location encompassed by the coverage areas of a fixed-site transceiver of both of the network portions. An interworking unit (IWU) 24 interconnects the network portions.

The mobile node 12 is representative of a mobile node that is a multi-node transceiver. That is to say, the mobile node is selectably operable to communicate by way of both the cellular network portion 14 and the wireless local area network portion 16. Determination must be made during operation of the communication system of with which of the network portions that the mobile node communicates. And, as the mobile node is permitted mobility, the mobile node might be operated to communicate by way of one of the network portions when positioned at one location and by way of another network portion when positioned at another location. And, for additional reasons, communications by the mobile node might need to be, or preferably be, communicated with one rather than another of the network portions.

The transceiver circuitry of the mobile node is here represented by the receive (RX) part 28 and a transmit (TX) part 32. The receive and transmit parts are selectably operable to communicate in conformity with the operating protocols of the first and second network portions formed of the cellular network and wireless local area networks.

The mobile node further includes apparatus, shown generally at 36, of an embodiment of the present invention. The apparatus 36 operates to facilitate selection, at the mobile node, of with which of the network portions that the mobile node shall communicate. Responsive to the selection, the transceiver circuitry of the mobile node is caused to be operated to communicate with the selected network portion of the communication system. And, during operation, re-selection of the network portion through which the mobile node communicates is also selectably made.

During operation of the communication system, control messages are broadcast by the fixed-site transceivers. And, pursuant to an exemplary implementation, the base transceiver stations 18 of the cellular network portion 14 broadcast signaling layer parameter messages that are delivered to the mobile node when the mobile node is positioned within the coverage areas of the respective fixed-site transceivers. The arrow 38 is representative of the broadcast of the messages. The messages, once delivered to the mobile node, are provided to the receive part 28.

The apparatus 36 of an embodiment of the present invention includes a detector 42 that is coupled to the receive part 28 and operates to detect delivery of the signaling layer parameter message to the mobile node. And, the detector includes an extractor for extracting values contained in the signaling layer parameter message. The extracted values are selectably compared by a comparator 46.

The apparatus further includes a buffer 48. The buffer contains memory locations at which values of the signaling layer parameter message detected by the detector are buffered. In the exemplary implementation, once values are buffered at the buffer, subsequently-received signaling layer parameter messages are compared with the buffered values, and updated values are buffered at the buffer when comparisons indicate changes to have been made in the values of the signaling layer parameter message.

The apparatus further includes a selector 52. The selector is coupled to the buffer to permit access to the values buffered thereat. The selector operates to select through which of the network portions that the mobile node shall subsequently communicate. Selections made by the selector, here indicated on the lines 54, are used at the receive and transmit parts 28 and 32 to cause operation of the mobile node in a WLAN or cellular operating mode, based upon the selections made by the selector. Thereby, the selection is made at the mobile node, and the selection is based upon dynamically alterable values, thereby providing flexibility to the operation of the manner by which the selections are made.

FIG. 2 illustrates a message sequence diagram, shown generally at 62, representative of operation of an embodiment of the present invention. The mobile node 12 and a base transceiver station 18 of the cellular network portion 14, and signaling therebetween, are represented in the figure. Here, and as represented by the block 64, the mobile node is in a cellular mode in an idle state thereof. And, the mobile node monitors overhead, i.e., control, channels for broadcast of the signaling level parameter message. And, as represented by the segment 66, the base transceiver station broadcasts such a message. The message contains operator preference criteria that is used by the selector pursuant to selection of with which network portion that the mobile node shall communicate.

Once the message is delivered to the mobile node, the detector (shown in FIG. 1) extracts the values contained in the message, the comparator compares the values with prior-stored values at the buffer (also shown in FIG. 1), and the contents of the buffer are selectably updated, as indicated by the block 68.

Figure 3:
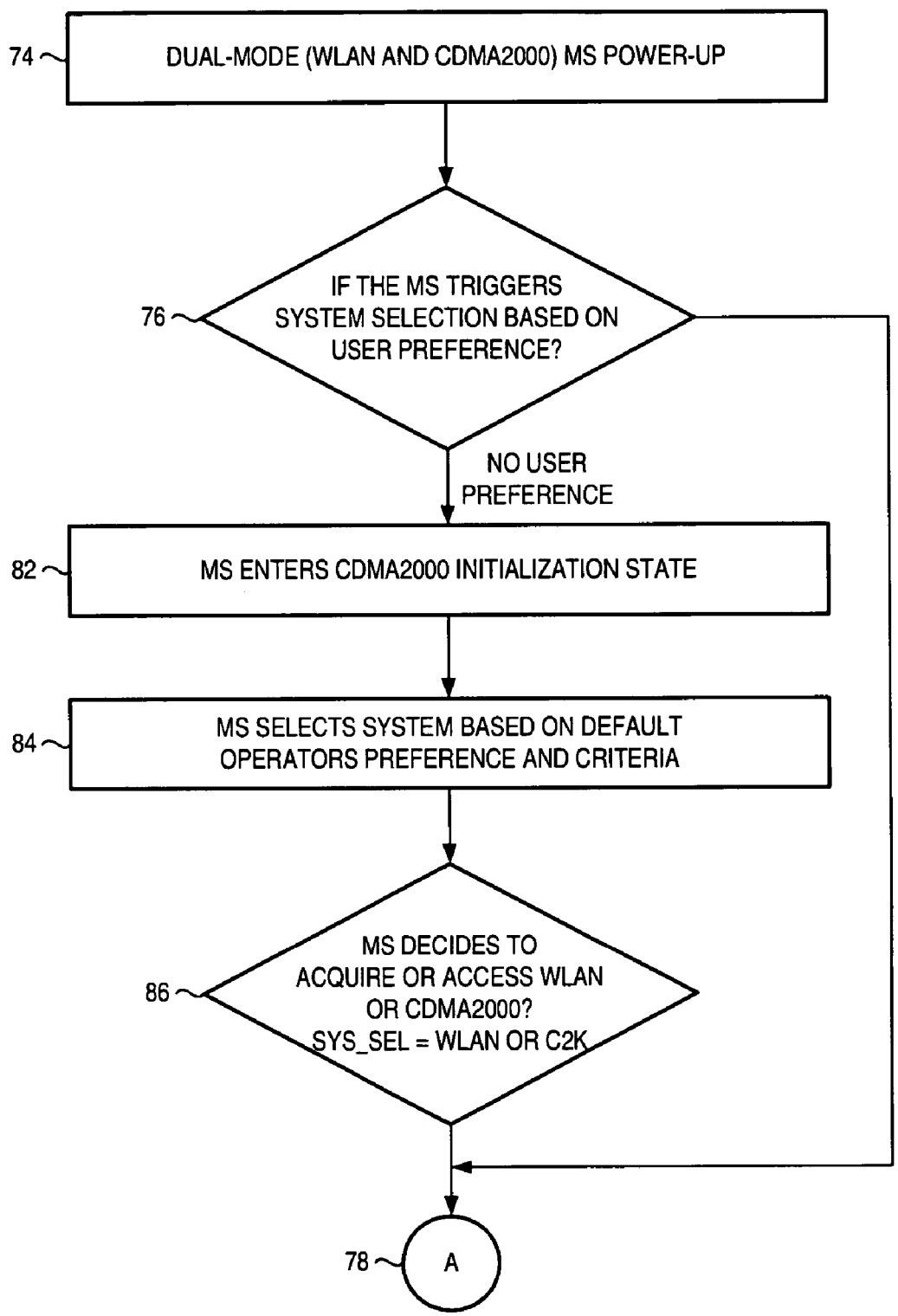
FIG. 3 illustrates a flow diagram representative of operation of an embodiment of the present invention.

FIG. 3 illustrates a flow diagram, shown generally at 72, representative of operation of an embodiment of the present invention by which a mobile node facilitates selection of through which network portion of a multiple-network radio communication system that the mobile node shall communicate. The mobile node, in the exemplary implementation, operates, alternately, in a WLAN mode and in a cellular mode. Further pursuant to operation in the exemplary implementation, the wireless local area network mode in which the mobile node is operable communicates pursuant to the operating specification of the IEEE802.11 standard. And, when operated in the cellular mode, the mobile node operates generally in conformity with the cdma2000 operating specification. In other implementations, the mobile node is operable pursuant to other operating specifications in which other combinations of communication systems are defined.

First, and as indicated by the block 74, the mobile node powers-up. Then, and as indicated by the decision block 76, a determination is made as to whether a manual system selection is made by a user of a mobile node. If the user of the mobile node makes a manual selection of through which of the network portions that the mobile node shall communicate, the yes branch is taken to connecting point 78. Otherwise, the no branch is taken to the block 82, and the mobile node enters the cdma2000 initialization state. Then, and as indicated by the block 84, selection is made at the mobile node of through which of the network portions to communicate based upon default values of an operator's preference criteria stored at the mobile node. Then, and as indicated by the decision block 86, a decision is made whether to change the operating mode of the mobile node out of the cdma2000 operating mode and into a WLAN operating mode. Here, a SYS_SEL parameter is set either to WLAN or C2K. And, a branch at the connecting point 78 is taken based upon which decision is made or which operating mode is selected manually at the decision block 76.

Figure 4:
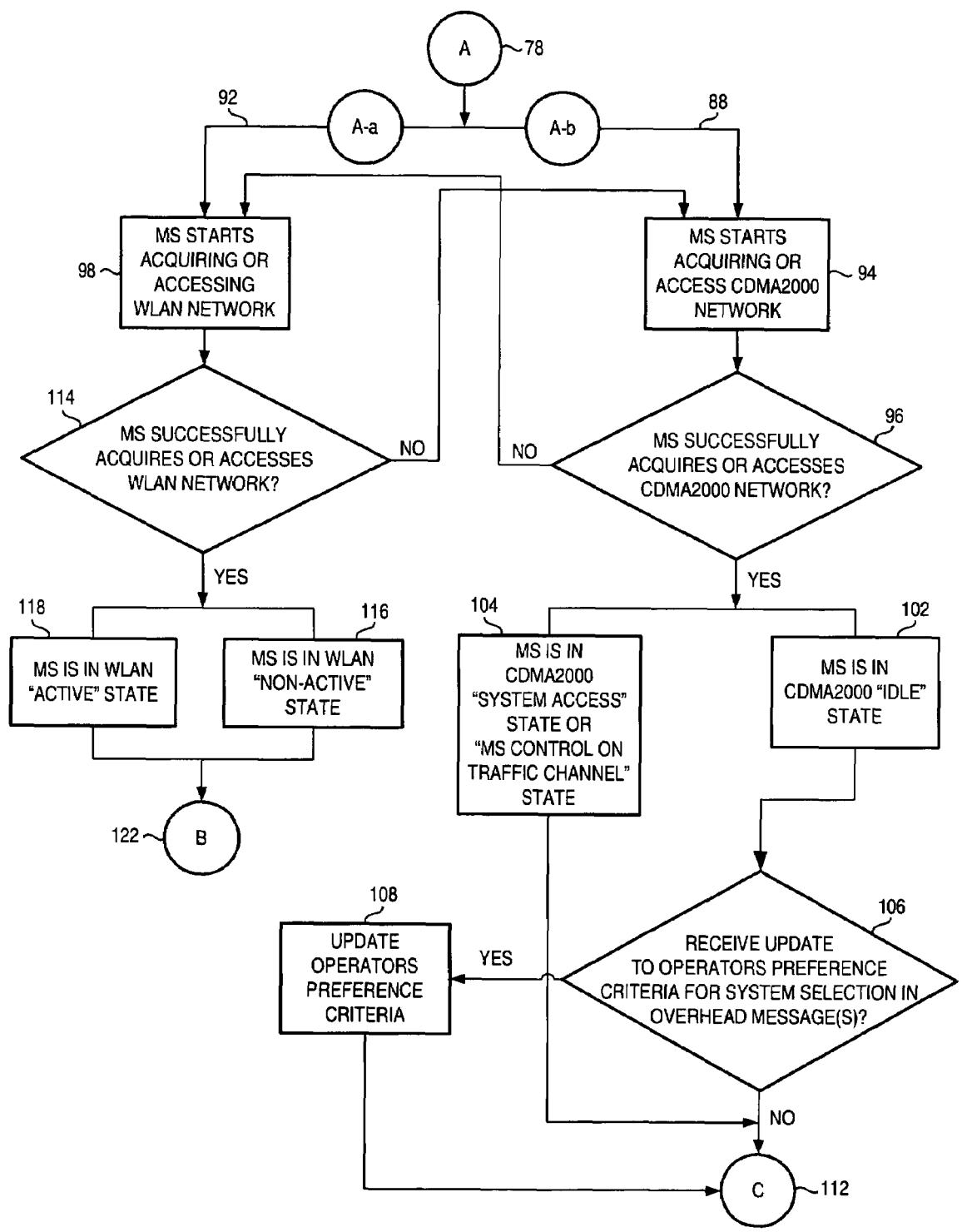
FIGS. 4 and 5 illustrate flow diagrams representative of further operation of an embodiment of the present invention.

FIG. 4 illustrates as continuation of the flow diagram shown in FIG. 3. The connecting point 78 is again shown. Here, the separate branches, branches 88 and 92, are shown. The branch 88 is taken when the mobile node decides to acquire or access the cdma2000 system at the decision block 86 or a decision is made manually by the user to cause the mobile node to operate pursuant to the cdma2000 mode. The branch extends to the block 94 whereat the mobile node commences acquiring or accessing the cdma2000 network forming the cellular network portion of the radio communication system. Then, and as indicated by the decision block 96, a determination is made as to whether the mobile node has successfully acquired or accessed the network portion. If not, the no branch is taken to the block 98. Otherwise, the yes branch is taken. The yes branch extends to alternate blocks 102 and 104. At the block 102, the mobile node is placed in a cdma2000 idle state. And, at the block 104, the mobile node is placed into a cdma2000 system access state or a mobile node control on traffic channel state. The mobile node is placed into the idle state at the block 102, a determination is made as to whether updates to the operator's preference criteria is contained in a message delivered to the mobile node. If so, the yes branch is taken to the block 108, and the buffered values are updated. A path is then taken to the connecting point 112. A path is also taken from the block 104 to the connecting point 112. And, the no branch from the decision block 106 also extends to the connecting point 112.

When the branch 92 is taken, indicating that the mobile node is to be operated in the WLAN mode, the branch extends to the block 98. And, the mobile node starts acquiring or accessing the WLAN network portion of the communication system.

Then, and as indicated by the decision block 114, a determination is made as to whether the mobile node has successfully acquired or accessed the WLAN network portion. If not, the no branch is taken to the block 94, and the mobile node operates to acquire or access to the cellular network portion. If, conversely, the mobile node has successfully acquired or accessed the WLAN network portion, the yes branch is taken to one of the blocks 116 and 118. If a branch is taken to the block 116, the mobile node enters into the non-active state. And, if a branch is taken to the block 118, the mobile node enters the active state. The blocks 116 and 118 extend to the connecting point 122.

Figure 5:
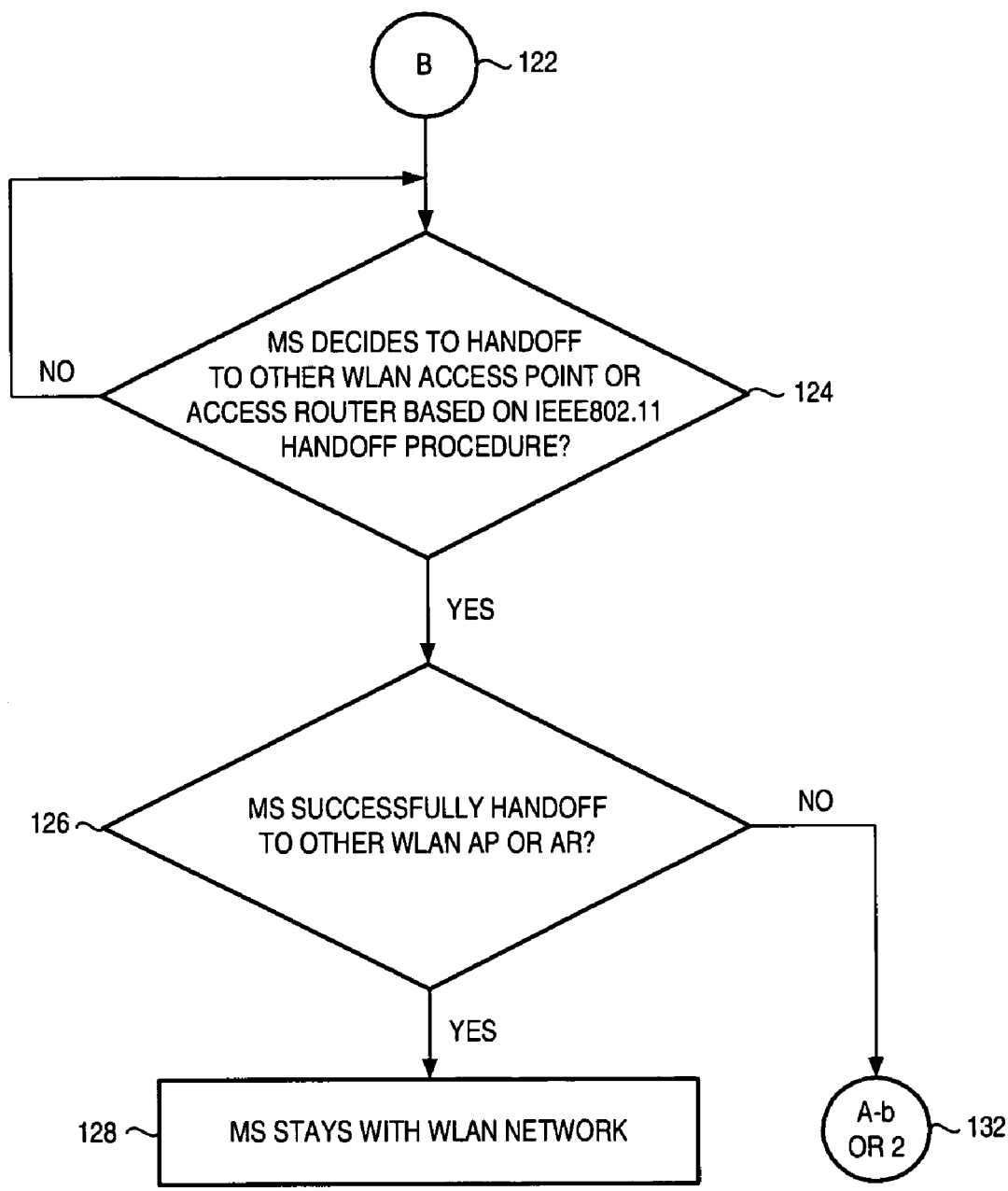

FIG. 5 illustrates a continuation of the operation described with respect to FIGS. 3 and 4. And, more particularly, the flow diagram shown in FIG. 5 illustrates continued operation at the connecting point 122. A determination is made, as indicated by the decision block 124, as to whether the mobile node decides to handoff communications to another WLAN access point or access router based upon an IEEE802.11 handoff procedure. If not, the no branch is taken back to the decision block. If, conversely, a decision is made to handoff communications, the yes branch is taken to the decision block 126. At the decision block 126, a determination is made as to whether the handoff has been successfully executed. If so, the yes branch is taken to the block 128, and the mobile node communicates by way of a WLAN network portion. If, conversely, the mobile node has not successfully handed off to a target access point, the no branch is taken to the control point 132. The control point 132 branch is back to the branch 88 shown in FIG. 4. And, the mobile node attempts to acquire or access the cellular network portion of the communication system.

Figure 6:
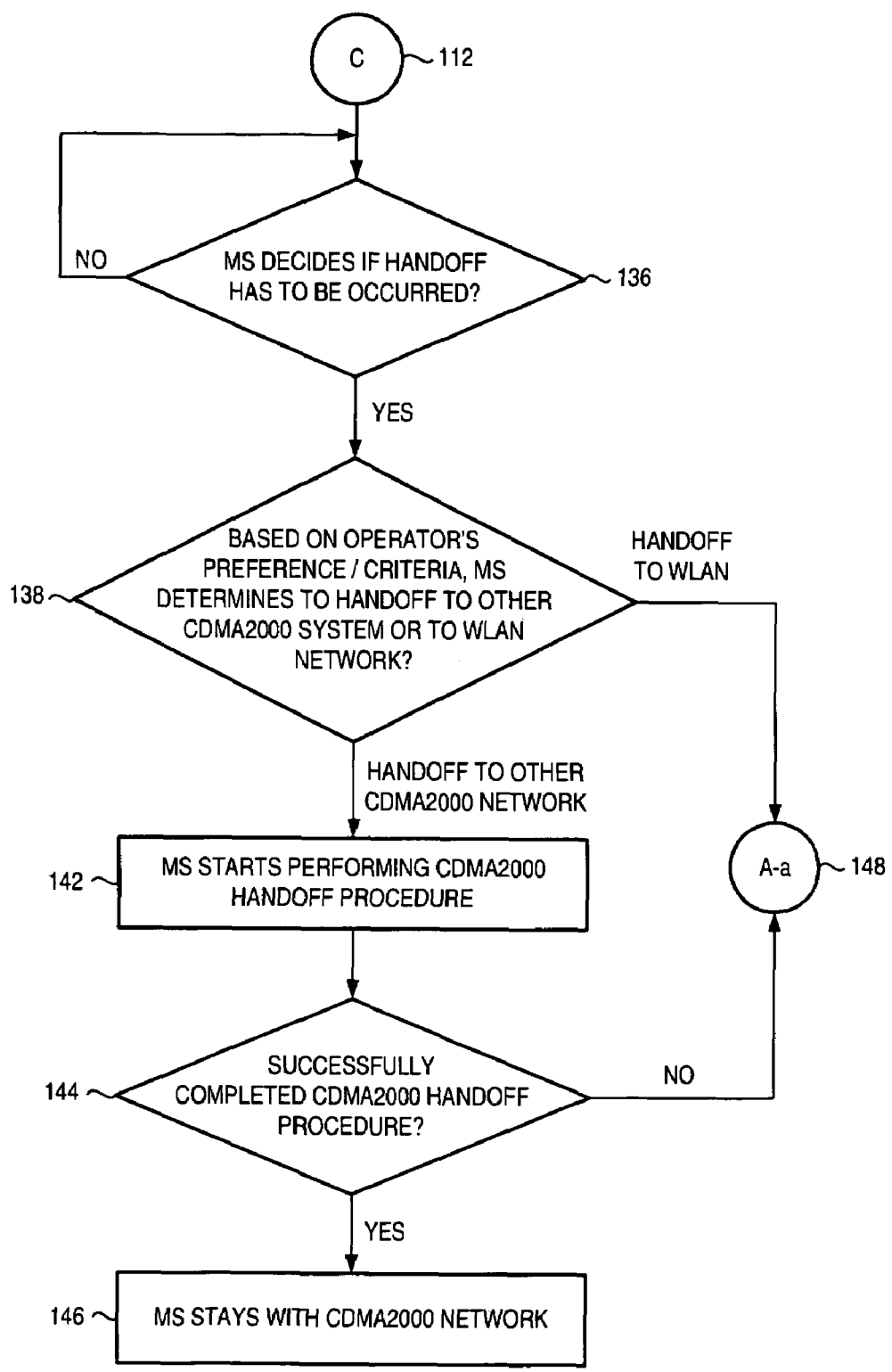
FIG. 6 illustrates a flow diagram also representative of further operation of an embodiment of the present invention.

FIG. 6 illustrates further operation of an embodiment of the present invention, here, commencing with the control point 112 shown in FIG. 4. At the control point, the mobile node is operated to communicate by way of the cellular network portion of the communication system.

A determination is made at the decision block 136 as to whether the mobile node has determined that a handoff is required to hand off communications to a target fixed-site transceiver. If not, the no branch is taken back to the decision block. Otherwise, if a determination is made that a handoff of communications is required, the yes branch is taken to the decision block 138. At the decision block 138, a determination is made as to whether the handoff is to a target base transceiver station of the cellular network portion or to a target access point of the wireless local area network portion. The determination is made based upon operator preference criteria.

If a determination is made to hand off communications to a base transceiver station of the cellular network portion, a branch is taken to the block 142. At the block 142, the mobile node starts performing cdma2000 handoff procedures. Then, a branch is taken to the decision block 144, and a determination is made as to whether the handoff procedure is successfully completed. If so, the yes branch is taken to the block 146. And, at the block 146, a mobile node continues with communications by way of the cellular network portion.

If, conversely, a determination is made at the decision block 138 to hand off to target access point of the WLAN network portion or if a determination is made at the decision block 144 that a successful handoff is not completed in the cellular network portion, branches are taken to the control point 148 that extends to the branch 92 shown in FIG. 4. And, the mobile node attempts to acquire access to the WLAN network portion of the communication system.

FIG. 7 illustrates a table, shown generally at 152, representative of exemplary operator preference criteria used pursuant to operation of an embodiment of the present invention by which to facilitate selection. The column 154 lists causes for system selection/determination defined in the cdma2000 signaling specification. Additional causes and criteria based thereon are also permitted. The column 156 indicates updated operator preference/criteria associated with the values listed in the column 154. And, the column 158 lists default operator preferences/criteria associated with the values shown in the column 154.

A first value listed in the column 154 is an acquisition failure value 162. The acquisition failure value is based upon an acquisition failure indication. If the mobile node fails to receive a valid synchronization channel message within a selected period, e.g., $T_{21m}$ seconds, the mobile node enters a system determination substate with an acquisition failure indication.

The new system value 164 is based upon a new system indication. In a new system indication, the mobile node enters the system indication determination substate of the mobile node initialization state with a new system indication, upon performing idle handoff to a neighbor base station.

The system reselection value 166 is based upon a system reselection indication. If a mobile node supports more than one operating mode or the remaining sets/neighbor set contains pilots on frequencies different from the current frequency, the mobile node enters into the system determination substate of the mobile node initialization state with a system reselection if certain criteria are true.

The rescan value 168 is based upon a rescan indication cause. If the $RESCAN_r$ field in a system parameter message equals "1", the mobile node enters the system determination substate of the mobile node initialization state with a rescan indication.

The protocol mismatch value 172 is based upon a protocol mismatch indication cause. If a protocol revision level supported by the mobile node ($MOB\_P\_REV_p$) is less than a minimum protocol revision level supported by a base transceiver station ($MIN\_P\_REV_r$), the mobile node enters the system determination substate of the mobile station initialization state with a protocol mismatch indication.

The system lost value 174 is based upon a system lost indication cause. Various conditions cause a system lost indication. Such conditions include, e.g., if the layer 3, L3, receives an indication from a lower layer, e.g., L2, that the system is lost, the mobile station shall update its registration variables that were stored from a first base transceiver station to which the mobile node transmitted an access probe and enters the system determination substate of the mobile node initialization state with a system lost indication. System lost conditions also include expiration of a system access state timer while in the substate. The mobile node shall enter the system determination substate of the mobile node initialization state with a system lost indication. If the mobile node does not receive a period of a selected period size with a sufficient signal quality on the forward, power control subchannel assigned to the mobile station within a certain period after entering the substate, the mobile node shall enter the system determination substate of the mobile node initialization state with a system lost indication.

Also, the mobile node shall perform a forward traffic channel supervision. If a loss of the forward traffic channel is declared, the mobile node enters into the system determination substate of the mobile node initialization state with a system lost indication. If the mobile node does not receive a period of a selected time with a sufficient signal quality on a physical channel corresponding to $FPC\_PRI\_CHAN_s$ within a selected period after entering the substate, the mobile node shall enter the system determination substate of the mobile node initialization state with a system lost indication. The mobile node performs a forward traffic channel supervision. If a loss on the forward traffic channel is declared, the mobile node enters the system determination substate of the mobile station initialization state with a system lost indication.

Additionally, system lost indications are indicated if an L3 layer receives an L2-condition dot notification primitive from the L2 layer indicating an acknowledgement failure. The mobile node disables its transmitter and enters into the system determination substate of the mobile node initialization state with a system lost indication. Additionally, if the L3 layer does not receive a forward dedicated channel acquired indication from the L2 layer within a selected time period subsequent to the first occurrence of the receiving of a period of a selected time with sufficient signal quality on the physical channel corresponding to the $FPC\_PRI\_CHAN_s$ or a period of a selected time period with a sufficient quality signal on the forward common power control subchannel assigned to the mobile node, the mobile node also disables its transmitter and enters the system determination substate of the mobile node initialization state with a system lost indication.

Additionally, the mobile node performs forward traffic channel supervision. If a loss of the forward traffic channel is declared, the L3 layer shall terminate all call control instances, and enters the system determination substate of the mobile node initialization state with a system loss indication.

Additionally, if there are no other active or pending calls, the L3 layer terminates the call control instance. And, the mobile station disables its transmitter and enters the system determination substate of the mobile node initialization state with a system lost indication.

A mobile node operates in the non-slotted mode and, when operated therein, monitors the paging channel or the forward common control channel/primary broadcast control channel at all times. If the mobile node declares a loss of the paging channel or the forward common control channel/primary broadcast control channel, the mobile node enters the system determination substate of the mobile node initialization state with a system lost indication.

If the mobile node declares a loss of the paging channel or the forward common control channel/primary broadcast control channel, the mobile node also enters into a system determination substate of the mobile node initialization state with a system lost indication.

And, if a L3 layer receives an indication from the L2 layer that the system is lost, the mobile node updates its registration variables that were stored from the first base station to which the mobile node transmitted an access probe and the mobile node enters the system determination substate of the mobile node initialization state with a system lost indication.

The access denied value 176 is based upon an access denied indication. If the L3 layer receives an indication from the L2 layer that the system access is denied, the mobile station shall update its registration variables that were stored from the first base transceiver station to which the mobile node sent an access probe and enters the system determination substate of the mobile node initialization state with a system lost indication.

An error indication value 178 is formed responsive to an error indication cause. If the mobile node does not support an assigned cdma channel or all of the assigned forward traffic code channels, the mobile node enters a system determination substate of the mobile node initialization state with an error indication.

A registration rejected value 182 is based upon a registration rejected order. This order indicates that normal service is not available on the system. The mobile node shall disable the full-TMSI timer. If the receive order specifies to delete the TMSI, the mobile node sets all of the bits of the TMSI_CODE$_{s-p}$ to "1". The mobile node enters the system determination substate of the mobile node initialization state with a registration rejected indication.

The wrong network value 184 is based upon a wrong network indication. If a REDIRECTION$_s$ is equal to enabled, the EXPECTED_SID field of REDIRECT_REC$_s$ is not equal to "0". And, the SID$_r$ is not equal to EXPECTED_SID. The mobile node shall enter the system determination substate with a wrong system indication. If the REDIRECTION$_s$ is equal to enabled, the EXPECTED_NID field of REDIRECT_REC$_s$ is not equal to 65535, and NID$_r$ is not equal to EXPECTED_NID, the mobile node enters the system determination substate with a wrong network indication.

Thereby, through operation of an embodiment of the present invention, a mobile node is better able to select through which network portion of a multi-network, radio communication system that the mobile node should communicate. Dynamic changes are possible to the selection procedure by the communication of messages to the mobile node.

The previous descriptions are of preferred examples for implementing the invention, and the scope of the invention should not necessarily be limited by this description. The scope of the present invention is defined by the following claims.

What is claimed is:

1. In a radio communication system having a network part including a first network portion operable pursuant to a first communication scheme and a second network portion operable pursuant to a second communication scheme and the radio communication system having a mobile node selectably operable to communicate by way of either of the first network portion and the second network portion, and the radio communication system defined in terms of logical layers including a signaling layer, an improvement of apparatus for facilitating selection, by the mobile node, of through which of the first and second network portions, respectively, that the mobile node shall communicate, said apparatus comprising:
    a signaling layer parameter message detector embodied at the mobile node, said signaling layer message detector selectably for detecting values populating the signaling layer parameter message;
    a signaling layer parameter message buffer adapted to receive indications of the values detected by said signaling layer parameter message detector, said signaling layer parameter message buffer for buffering the values of the signaling layer parameter message; and
    a selector embodied at the mobile node, said selector selectably for selecting through which of the first and second network portions to communicate based upon the values buffered at said signaling layer parameter buffer,
    wherein the values of the signaling layer parameter message buffered at said signaling layer parameter message buffer are updated when values detected by said signaling layer parameter message parameter differ from corresponding values stored at said signaling layer parameter message buffer.

2. The apparatus of claim 1 wherein the mobile node is initialized pursuant to initialization procedures and wherein selection made by said selector is made during the initialization procedures responsive to the values continued in said signaling layer parameter message buffer when the selection is made.

3. The apparatus of claim 2 wherein the initialization procedures are performed pursuant to the first communication scheme and wherein selection made by said selector selects whether to continue operation of the mobile node pursuant to the first communication scheme or, alternately, to operate the mobile node pursuant to the second communication scheme, thereby alternately to communicate by way of the first network portion or the second network portion.

4. The apparatus of claim 1 wherein the mobile node is selectably operable pursuant to the first communication scheme, the first communication scheme defining a mobile-node idle state, the mobile node further selectably operable in the mobile-node idle state, and wherein said signaling layer parameter message detector operates when the mobile node is operated in the mobile-node idle state.

5. The apparatus of claim 1 wherein the first network portion comprises a first set of fixed-site transceivers and the second network portion comprises a second set of fixed-site transceivers, wherein communication hand-overs between fixed-site transceivers is selectably effectuated during operation of the radio communication system, and wherein selection made by said selector is determinative, in part, of to which of the fixed-site transceivers to which communications are handed-off.

6. The apparatus of claim 1 wherein the radio communication system comprises a cdma2000-WLAN communication system that defines transmission of an acquisition failure indication at the signaling layer and wherein the signaling layer parameter message selectably comprises an indication of generation of the acquisition failure indication.

7. The apparatus of claim 1 wherein the radio communication system comprises a cdma2000-WLAN communication system that defines transmission of a new system indication at the signaling layer and wherein the signaling layer parameter message selectably comprises an indication of generation of the new system indication.

8. The apparatus of claim 1 wherein the radio communication system comprises a cdma2000-WLAN communication system that defines transmission of a rescan indication at the signaling layer and wherein the signaling layer parameter message selectably comprises an indication of generation of the rescan indication.

9. The apparatus of claim 1 wherein the radio communication system comprises a cdma2000-WLAN communication system that defines transmission of a protocol mismatch indication at the signaling layer and wherein the signaling layer parameter message selectably comprises an indication of the protocol mismatch indication.

10. The apparatus of claim 1 wherein the radio communication system comprises a cdma2000-WLAN communication system that defines transmission of a system lost indication at the signaling layer and wherein the signaling layer parameter message selectably comprises an indication of the signaling lost indication.

11. The apparatus of claim 1 wherein the radio communication system comprises a cdma2000-WLAN communication system that defines transmission of an access denied indication at the signaling layer and wherein the signaling layer parameter message selectably comprises an indication of the access denied indication.

12. The apparatus of claim 1 wherein the radio communication system comprises a cdma2000-WLAN communication system that defines transmission of an error indication at the signaling layer and wherein the signaling layer parameter message selectably comprises an indication of the error indication, 13. The apparatus of claim 1 wherein the radio communication system comprises a cdma2000-WLAN communication system that defines transmission of a registration rejected indication at the signaling layer and wherein the signaling layer parameter message selectably comprises an indication of the registration rejected indication.

14. The apparatus of claim 1 wherein the radio communication system comprises a cdma2000-WLAN communication system that defines transmission of a wrong network indication at the signaling layer and wherein the signaling layer parameter message selectably comprises an indication of the wrong network indication.

15. A method for communicating in a radio communication system having a network part including a first network portion operable pursuant to a first communication scheme and a second network portion operable pursuant to a second communication scheme and the radio communication system having a mobile node selectably operable to communicate by way of either of the first network portion and the second network portion, and the radio communication system defined in terms of logical layers including a signaling layer, said method for facilitating selection, byte mobile node, of through which of the first and second network portions, respectively, that the mobile node shall communicate, said method comprising the operations of:

selectably detecting, at the mobile node, values of a signaling layer parameter message;

selectably buffering at least selected values of the signaling layer parameter message detected during said operation of selectably detecting, the selectably buffering including comparing the values detected during said operation of selectably detecting with corresponding prior-stored values previously buffered and for selectably updating the values responsive to said operation of comparing when values detected differ from the corresponding prior-stored values; and selecting through which of the first and second network portions to communicate based upon values buffered during said operation of buffering.

16. The method of claim 15 wherein said operation of selecting comprises retrieving at least a selected value buffered during said operation of buffering and making selection responsive to the at least the selected value retrieved during said operation of retrieving.

17. The method of claim 16 further comprising the operation of determining which value to retrieve during said operation of buffering.

18. The method of claim 15 wherein the mobile node is selectably operable in both an active mode and in an inactive mode and wherein said operations or detecting, buffering, and selecting are performable when the mobile node is operated in either of the active and inactive modes, respectively.

* * * * *

UNITED STATES PATENT AND TRADEMARK OFFICE
CERTIFICATE OF CORRECTION

PATENT NO. : 7,672,690 B2  
APPLICATION NO. : 10/829922  
DATED : March 2, 2010  
INVENTOR(S) : Hsu et al.

Page 1 of 1

It is certified that error appears in the above-identified patent and that said Letters Patent is hereby corrected as shown below:

Title page,
Item (75), Inventors, "Chenghua Cheng" should read --Chinghua Cheng--.

Column 12,
Line 4, "continued" should read --contained--.

Column 13,
Line 29, "byte" should read --by the--.

Column 14,
Line 27, "operations or detecting" should read --operations of detecting--.

Signed and Sealed this
Twelfth Day of July, 2011

David J. Kappos
*Director of the United States Patent and Trademark Office*